United States Patent [19]

Orner

[11] 3,954,004

[45] May 4, 1976

[54] SELF-CONTAINED STRESS INDICATOR MECHANISM

[76] Inventor: Harry Orner, 2479 Glen Canyon Road, Altadena, Calif. 91001

[22] Filed: Jan. 23, 1975

[21] Appl. No.: 543,642

Related U.S. Application Data

[63] Continuation-in-part of Ser. No. 141,260, May 7, 1971.

[52] U.S. Cl. ............................. 73/88 F; 73/141 A
[51] Int. Cl.² .......................................... G01L 5/00
[58] Field of Search ............. 73/88 F, 141 R, 141 A

[56] References Cited
UNITED STATES PATENTS

| | | | |
|---|---|---|---|
| 1,994,388 | 3/1935 | Erichsen | 73/141 A |
| 3,410,135 | 11/1968 | Reynaud | 73/141 R |
| 3,602,186 | 8/1971 | Popenoe | 73/88 F X |
| 3,638,479 | 2/1972 | Boutet | 73/88 F |

*Primary Examiner*—Jerry W. Myracle

[57] ABSTRACT

A self-contained stress indicator that can be incorporated in a structural element of a consumer product such as a bolt. An enclosed cylinderical hole in the head of the bolt of a predetermined effective end area completely filled with a fluid such as an elastomatic material. A rod with an effective predetermined area extends into the cylinderical hole, responsive to the volumetric change therein, to be actuated through the medium of the fluid in a measurable fixed relation to the stress value of the bolt.

14 Claims, 7 Drawing Figures

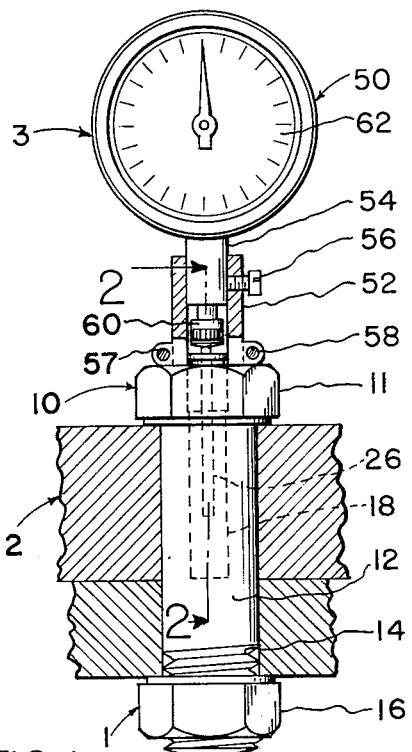
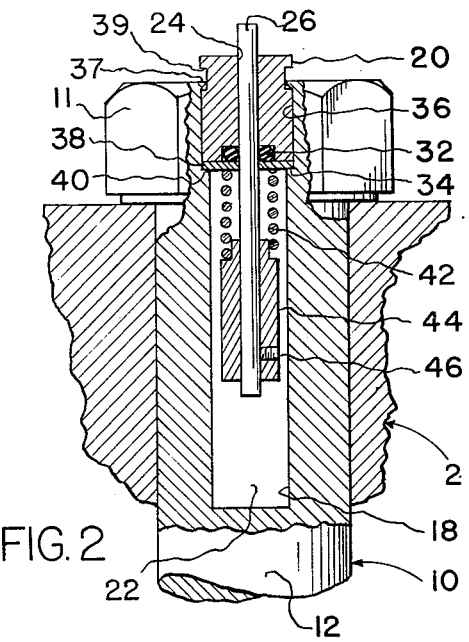
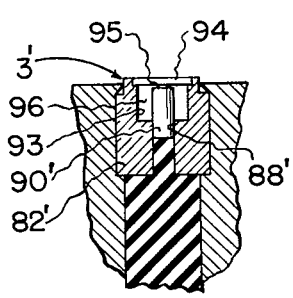
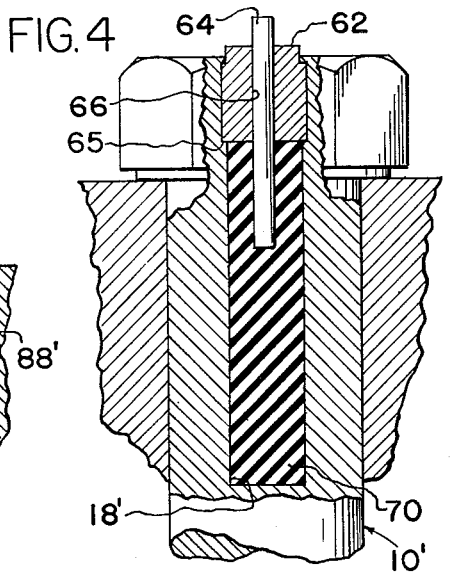
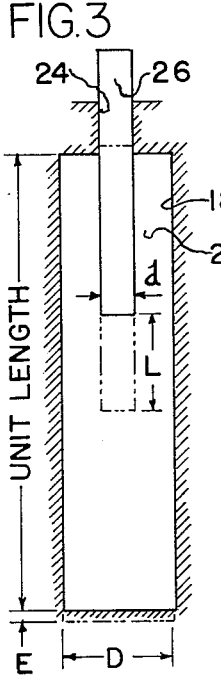
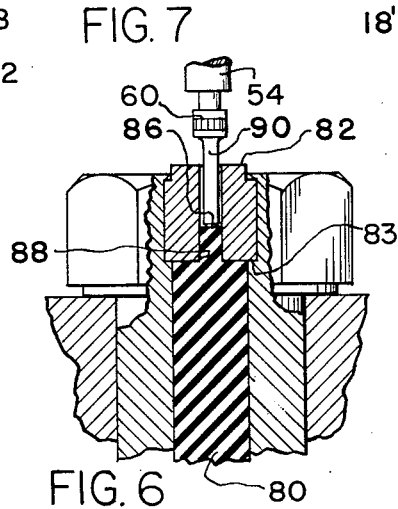
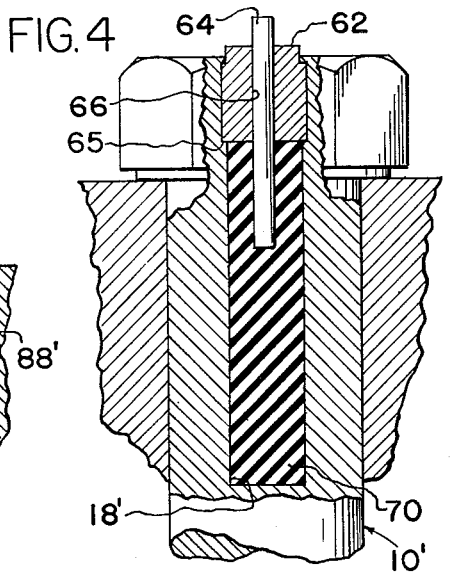

SELF-CONTAINED STRESS INDICATOR MECHANISM

This application constitutes a continuation-in-part of my co-pending application for U.S. Letters Patent, Ser. No. 141,260, filed May 7, 1971.

A bolt should maintain a precise clamping load on the parts of an assembly for safety consideration. This attaining and maintaining of this correct clamping load is a problem that has been attempted with limited success.

Popular use has been made of the torque wrench which uses a measurement of torque to indicate a value of the clamping load. This method is limited in accuracy in the transfer of this energy by the bolt threads. Screw threads vary in friction on the thread surfaces with different surface finishes, plating, lubrication, dirt, and dynamic and static applied force.

A more ideal method is to measure bolt elongation directly by the use of a micrometer over the ends of the bolt, and making use of Hooke's Law: Modulus of Elasticity = Unit Stress/Unit Strain. Reference is made to the applicant's U.S. Pat. No. 2,889,729, Apparatus for Screw Tensioning of Elongation Value, for more detail disclosure of this method.

This method has its limitations in three important respects;

1. The ends of the bols are not always accessible for measurement.
2. The method is time consuming because of the hunt-and-find procedure of tighting and measuring until full elongation is attained.
3. Elongation values are limited, in significant accurate resolutions. For, steel, a measurable variation of one mil (0.001 inch) per unit length will give a variation of 30,000 pounds per square inch in stress, resulting in a significant percent error.

The present invention provides an improved self-contained stress indicator which can be incorporated in the structural element of a consumer product such as a bolt, obviating the foregoing disadvantages and others as will be apparent by the following disclosure. In lieu of the limited measurement of the prior art, this invention provides increased accuracy.

It is the primary object of this invention to provide a stress indicator of increased accuracy.

Another object of this invention is to provide a self-contained stress indicator which can be incorporated in the body structure of a consumer product such as a bolt.

Another object of this invention is to provide a self-contained stress indicator which will indicate relative smaller increments of measurements in stress load.

Another object of this invention is to provide a self-contained stress indicator incorporated in a body structure, having a measurable inherent fixed relation to the linear deformation of the body structure, so that no prior calibrations are required.

Another object of this invention is to provide an article of manufacturing as a consumer product of simple construction for economical fabrication.

Other advantages of this invention will become fully apparent as reference is had to the specification and drawings.

FIG. 1, is a longitudinal view, partly in section, showing a preferred embodiment of this invention.

FIG. 2, is an enlarged fragmentary view taken on the line 2—2 of FIG. 1.

FIG. 3, is a diagrammatical view of FIG. 2.

FIG. 4, is a view similar to FIG. 2, illustrating a modification of the invention.

FIG. 5, is a fragmentary view of FIG. 4, illustrating component elements in process of assembly.

FIG. 6, is a view similar to FIG. 4, illustrating another modification of the invention.

FIG. 7, is a view similar to FIG. 6, illustrating another modification of the invention.

Illustrated in FIG. 1, is a bolt assembly 1 retaining in clamped stress an element of a machine 2. A dial indicator 3 is mounted on the bolt assembly 1.

The bolt assembly 1 consists of a bolt 10 with a head 11, a shank 12 partly threaded at 14, and a nut 16 coacting with the threaded portion 14. The bolt, see FIG. 2, is provided with a cavity formed as a cylindrical hole 18, and closed by a plug 20 to confine therein a fluid material such as a liquid 22. A passage 24 in plug 20 is provided for a close-fitted rod 26 to extend into the cylinderical hole 18 contacting the liquid 22.

The liquid 22 completely fills the cylindrical hole 18, A seal 32 on the rod 26 makes a tight enclosure of the liquid therein. The plug 20 is press-fitted into the hole 36. Seal 32 is retained between the inner end 34 of the plug 20 and a disc 38 on the shoulder 40. Plug 20 can be further secured by crimping around the hole 36 at 37 into reduced diameter 39 of plug 20.

To assure positive movement of the rod 26 to overcome friction, a spring 42 is provided to be compressed between the disc 38 and a sleeve 44 retained by a screw 46 on the rod 26.

The cylinderical hole 18 need not decrease the working stress of the shank 12, if consideration is made of the mean equivalent area of the threaded portion of the shank 12 relative to the full diameter of the bolt shank 12, by providing a cylinderical hole 18 of an effective area not to exceed the difference of these two areas of the shank 12.

FIG. 3, illustrates a diagram of the cylinderical hole 18 with rod 26 in functional position in passage 24. The cylinderical hole 18, let say for example, is of a unit length and of a large diameter D. The passage 24 is of a small diameter d. We are interested in obtaining the hydraulic displacement of an elongation E of the bolt shank 12 in terms of the relative rod movement L. Any volume change of the value of elongation E will be displaced hydraulically by rod 26. However since the area of diameter D is, for example, say ten times greater than the area of diameter d, the rod 26 will be moved the distance L, ten times greater than the elongation E. This is a fixed relation of the predetermined area of diameter d relative to the predetermined area of diameter D, inherent in the structure which would require no calibrations of the distance L to the elongation E.

The movement L of the rod 26 can be measured in any desired manner, in this instant use is made of a commercial dial indicator 50, see FIG. 1, mounted in a sleeve 52. The stem 54 of the dial indicator 50 is fixed into the upper end of the sleeve 52 and retained by a screw 56. The lower end is seated on the top of the bolt head 11 over the plug 20, and retained in place by the bifurcation 57 clamping the plug 20 by the screws 58. The plunger 60 of the dial indicator 50 is held in contact with the upper end of rod 26 by a spring therein (not shown). Any movement of rod 26 can be read directly in mils on the face 62 of the dial indicator 50.

In steel bolts, taking in consideration the Modulus of Elasticity, each mil of elongation in a unit length of shank 12 will require a stress of 30,000 pounds per square inch. Carrying the above example further, the dial indicator 50 will give a reading of 10 mils for each 30,000 pounds per square inch, or 3,000 pounds per square inch for each mil on the dial indicator 50. This is because of the fixed inherent relation due to the relative predetermined areas of diameter D to diameter d, of FIG. 3. The dial indicator face 62 can be calibrated in pounds per square inch of unit stress, if desired, since unit stress is a direct mathmatical linear function of unit strain as per Hooke's Law.

When the stress on the bolt 10 is removed by wrenching nut 16 to relieve the stress in shank 12, the cylinderical hole 18 recovers to original unit length, decreasing the volume of the cylinderical hole 18, forcing the fluid material 22 to displace the rod 26 to project up the distance L against the plunger 60 of the dial indicator 50.

FIG. 4, illustrates a modification of this invention, wherein the bolt 10' has a cylinderical hole 18' provided with a plug 62 to form an enclosed cavity. The cylinderical hole 18' is completely filled with a fluid material 70 which in this illustrated instant is of an elastomatic material such as for example natural rubber. A hole 66 through plug 62 forms a passage for a rod 64. The lower end of the rod 64 is retained to the elastomeric material by adhesion. The passage 66 forms the effective area similar to the passage 24 of FIG. 3.

This modification of the invention will operate in the same manner as the form illustrated in FIG. 2, but simpler in construction. The rod 64 is biased inwardly by the resilience of the elstomatic material 70 under an initial predetermined pressure in the cylinderical hole 18'. This initial predetermined pressure can best be attained as illustrated in FIG. 5. The elastomeric material 70 extends above the shoulder of the plug seat 65 a predetermined distance. The plug 62 is pressed into place in a press-fit until it is seated on shoulder 65, the elastomatic material becomes compressed and deformed to the wall of the cylinderical hole 18' and plug 62. Rubber and other similar elastomeric material does not have sufficient volumetric compressibility to be concerned about the volumetrical change of the material. The elastomatic material 70 retains its volume to displace the rod 64 to move upward to the position seen in FIG. 4. The resilience of the elastomeric material tends to recover its original shape to draw the rod 64 inward the distance L (indicated in the phantom position) when the unit length of cylinderical hole 18' increases the distance of the elongation E, see FIG. 3.

FIG. 6, illustrates another modification of the invention, slightly different in construction to that of FIG. 4, the elastomatic material 80 is confined in the cavity much like that shown in FIG. 5, but when the plug 82 is seated on plug seat 83 the elastomatic material under pressure is distorted and displaced to be forced into the passage 88 at a reduced area to form a end surface 86 therein. The surface 86 pushes a shorter rod 90. The rod 90 may be adhered to the surface 86 of the elastomatic material 80 at its lower end. The resilience of the elastomatic material 80 to recover its original shape moves the reduced surface 86 inward the distance L when the unit length of the cylinderical hole 18' is increased the distance E as shown in FIG. 3, moving the rod 90 with it.

The rod 90 in FIG. 6 can also be an adapter of the plunger 60, see FIG. 1, but of a diameter to pass through the passage 88 to contact the end surface 86. The movement of extruded end surface 86 can be measured relative to the value E of FIG. 3, directly. The rod 90 would not be adhered to the surface 86 but would be an integral part and attached thereto the dial indicator 50.

FIG. 7, illustrates another modification of the invention, different in construction to that of FIG. 6, in that it includes an indicator means 3', of the type taught in U.S. Pat. No. 3,602,186, with the exception, instead of a pin fixed to the bottom of the hole in the bolt, this invention provides the independent end surface 86 of this invention movable in a passage 88' at an increased linear rate. The indicator means 3' is completely self-sealed unit with all the advantages pointed out in U.S. Pat. No. 3,799,108, but of an improved construction.

The indicator means 3' consists of a plug 82', a rod means 90' movable in passage 88' similar to the construction of FIG. 6. The plug 82' includes a chamber 93 and a window 94 on the outer end enclosing the chamber 93. Rod 90' includes an outer surface 95 visible through the window 94 in chamber 93 immersed in an opaque liquid 96. As the rod means 90' is moved toward the window 94 it will reach a predetermined position whereby the outer surface 95 becomes fully visible through the opaque liquid to indicate a relative low value of safe stress in the bolt. Plug 82' is inherently a self-sealed unit provided by the construction of this invention.

Fluid material as defined in this invention includes in general any material which can be changed by a force to conform in shape to the container walls, such as the force of elongation and contraction of the bolt 10 and 10'.

If significant, the factor of the Poisson's ratio of deformation at right angle to the load in the cylinderical holes 18 and 18' may be used in the volume displacement computation when establishing the ratio of the effective predetermined surfaces D and d of FIG. 3.

While this device herein shown and disclosed in detail is fully capable of attaining the objects and providing the advantages hereinbefore stated, it is to be understood that is is merely illustrative of the present preferred embodiments of the invention and that no limitations are intended to the details of construction or design herein shown other than as defined in the appended claims.

I claim:

1. In a stress indicator, a body structure adaptable to be stressed by a load, a confined cavity in said body structure, a fluid material completely filling said cavity, a surface means responsive to said fluid material to indicate a linear value of the volumetrical change in said cavity in relation to the linear deformation of said body structure, said fluid material is an elastomatic material under an initial pressure to conform to said cavity, a passage in a wall of said cavity for said surface means biased inward to said cavity by the resilience of said elastomatic material.

2. The invention in claim 1, in which said confined cavity is a cylinderical hole in said body structure, an effective end area in said cylinderical hole, a second closure at the open end of said hole, said elastomatic material confined in said cylinderical hole under said initial pressure, said cylinderical hole located axially with the direction of said applied load, said effective end area is larger than an effective area of said surface means, thereby said end area movable by the force of elongation to actuate through the medium of said elastomatic material the movement of said surface means at a relative increased rate.

3. The invention in claim 1, in which said surface means is formed by the extrusion of said elastomatic material in said passage with an end surface, said end surface biased in said passage inward to said cavity by the resilience of said elastomatic material.

4. The invention in claim 1, in which said surface means includes a movable rod means in contact with said elastomatic material, said elastomatic material confined therein under said initial pressure whereby said movable rod means is biased inward to said confined cavity by the resilience of said elastomatic material.

5. The invention in claim 1, in which said confined cavity is a cylinderical hole in said body structure, a closure to be fitted into the open end of said cylinderical hole, said passage in said closure extending to said cylinderical hole, said surface means includes a movable rod means in said passage in contact with said elastomatic material, said elastomatic material adaptable to be distorted in shape by the initial movement of said closure to thereby force said rod means outward in said passage.

6. The invention in claim 1, in which said confined cavity is a cylindrical hole in said body structure, a closure to be fitted into the open end of said cylinderical hole, said passage in said closure, said surface means includes a movable rod means in said passage in contact with said elastomatic material, said elastomatic material adaptable to be distorted in shape by the initial movement of said closure to thereby force said elastomatic material to be extruded into said passage to force said rod means outward.

7. The invention in claim 1, in which said body structure is a threaded bolt fastener, said linear elongation of said bolt structure volumetrically changes said confined cavity, said elastomatic material conformable to said volumetrical change by the said initial pressure therein, said surface means includes a rod means movable in said passage, a dial indicator associated with said rod means to indicate the relative movement, thereby to obtain the measurement of the bolt stress by the relative linear movement of said rod means through the medium of said elastomatic material in relation to the volumetrical change of said cavity.

8. The invention in claim 1, in which said confined cavity is a cylinderical hole in said body structure, an effective end surface in said cylinderical hole, a closure fitted into the open end of said cylindrical hole, said elastomatic material confined in said cylinderical hole under said initial pressure, said cylinderical hole axially located relatively parallel with the direction of the said applied load, said end surface being larger in area than said predetermined area of said surface means, said end surface movable relative axially by said applied load to move said surface means in a proportional increased fixed relation.

9. The invention in claim 8, in which said closure includes said passage extending inward to said cylinderical hole, said surface means includes the end surface of said elastomatic material extruded into said passage by the said initial pressure in said cylinderical hole, indicator means associated with said end surface of said elastomatic material to indiate the relative strain in said body structure.

10. The invention in claim 8, in which said closure includes said passage extending inward to said cylinderical hole, said surface means includes a rod means movable in said passage in contact with said elastomatic material to be biased inwardly thereby, said rod means includes an exterior surface indicating the relative movement thereby.

11. The invention in claim 10, in which said exterior surface is associated with a dial indicator, said body structure being a threaded bolt fastener with a head thereon, said cylindrical hole extending axially in said head end of said bolt relative parallel with said bolt body, removable structure means for said dial indicator to be mounted on said head, a plunger of said dial indicator in contact with said exterior surface of said rod means to measure the relative movement thereof relative to the strain in said bolt fastener.

12. The invention in claim 10, in which said rod means includes a visual indicator means at said exterior surface to indicate an outer position of said movable rod means at a relative low level of safe stress in said body structure, said rod means actuated to said outer position by the elastomatic material.

13. The invention in claim 12, in which said indicator means includes; a window aperature in said closure, said outer end of said rod having said exterior surface adjacent to said window, an opaque fluid in an enclosed chamber including said exterior surface, said rod means movable by said elastomatic material at an increased linear rate than said linear elongation of said body structure toward said window to reveal the exterior surface visually at a predetermined distance from said window.

14. In a stress indicator, a body structure adaptable to be stressed by a load, a confined cavity in said body structure, a fluid material completely filling said cavity, a surface means responsive to said fluid material to indicate a linear value of the volumetrical changes in said cavity in relation to the linear deformation of said body structure, said cavity is a cylinderical hole, a closure at the open end of said cylinderical hole, said cylinderical hole located relatively parallel with the direction of the said load on said body structure so that an end surface of said cylinderical hole is movable relatively axially, a passage in said closure and a rod means therein in contact with an effective area of said surface means, said effective area being relative in size to the effective area of said cylinderical hole to constitute an amplification of the linear movement of said rod means to the axial elongation of said cylinderical hole, a dial indicator associated with said rod means to measure the linear movement thereof, said body structure being a threaded bolt fastener with a head thereon, said cylinderical hole extended in said head end of said bolt relative parallel with the bolt body, removable structure means for said dial indicator to be mounted on said head, a plunger of said dial indicator is movable with said rod means to measure the movement thereof as a function of the strain in said bolt fastener.

* * * * *

UNITED STATES PATENT OFFICE
CERTIFICATE OF CORRECTION

Patent No. 3,954,004            Dated May 4, 1976

Inventor(s) Harry Orner            Page 1 of 2

It is certified that error appears in the above-identified patent and that said Letters Patent are hereby corrected as shown below:

Column 1, line 7, after "1971" insert -- ,now abandoned --.

Column 1, line 11, "attaining", should read -- attainment --;

Column 1, line 11, "maintaining", should read -- maintance --.

Column 1, line 16, "this" should be deleted.

Column 1, line 30, "bols" should read -- bolts --.

Column 3, line 27, "instant" should read -- instance --.

Column 3, line 46, "does" should read -- do --.

Column 4, line 47, first "is" should read -- it --.

Column 4, line 63, claim 1, After "means" insert --,said surface means

Column 4, line 66, claim 2, "second" should read --secured --.

Column 5, line 42, claim 7, "structure" should read -- fastener--.

Column 6, line 10, claim 10, "thereby" should be deleted.

Column 6, line 13, claim 10, "thereby" should read -- in said passage --.

UNITED STATES PATENT OFFICE
CERTIFICATE OF CORRECTION

Patent No. 3,954,004  Dated May 4, 1976

Inventor(s) Harry Orner  Page 2 of 2

It is certified that error appears in the above-identified patent and that said Letters Patent are hereby corrected as shown below:

Column 6, line 52, claim 14, "in contact" should read -- associated --.

Signed and Sealed this

Thirteenth Day of July 1976

[SEAL]

Attest:

RUTH C. MASON
*Attesting Officer*

C. MARSHALL DANN
*Commissioner of Patents and Trademarks*